(12) United States Patent
Nakaya et al.

(10) Patent No.: US 7,643,183 B2
(45) Date of Patent: Jan. 5, 2010

(54) IMAGING APPARATUS

(75) Inventors: Fumio Nakaya, Nakai-machi (JP);
Hirokazu Ichikawa, Nakai-machi (JP);
Yoichi Miyake, Inage-ku (JP);
Norimichi Tsumura, Inage-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 799 days.

(21) Appl. No.: 11/374,014

(22) Filed: Mar. 14, 2006

(65) Prior Publication Data

US 2006/0215933 A1    Sep. 28, 2006

(30) Foreign Application Priority Data

Mar. 28, 2005    (JP)    ............... 2005-091808

(51) Int. Cl.
*H04N 1/04*    (2006.01)
(52) U.S. Cl. .................. 358/474; 358/484; 358/475
(58) Field of Classification Search ................. 358/509, 358/510, 513, 514, 530, 520, 484, 480, 475, 358/477; 348/67, 68, 131, 132, 798; 399/4, 399/5; 351/213; 313/372
See application file for complete search history.

(56) References Cited

U.S. PATENT DOCUMENTS

| | | | | |
|---|---|---|---|---|
| 4,685,808 A * | 8/1987 | Nakazawa et al. | ......... | 356/416 |
| 7,460,226 B2 * | 12/2008 | Klein | ......... | 356/317 |
| 2001/0001240 A1 * | 5/2001 | Melville et al. | ......... | 345/32 |
| 2001/0002315 A1 * | 5/2001 | Schultz et al. | ......... | 436/172 |
| 2003/0030799 A1 * | 2/2003 | Chen et al. | ......... | 356/300 |
| 2004/0221957 A1 * | 11/2004 | Ludviksson | ......... | 156/345.24 |
| 2006/0139157 A1 * | 6/2006 | Takao et al. | ......... | 340/442 |
| 2006/0203248 A1 * | 9/2006 | Reichardt et al. | ......... | 356/437 |

FOREIGN PATENT DOCUMENTS

| | | |
|---|---|---|
| JP | HEI-5-313537 | 11/1993 |
| JP | HEI-5-33643 | 12/1993 |
| JP | HEI-6-70097 | 3/1994 |

* cited by examiner

*Primary Examiner*—Jerome Grant, II
(74) *Attorney, Agent, or Firm*—Morgan, Lewis & Bockius LLP

(57) ABSTRACT

The imaging apparatus includes a light application unit that applies light to an object to be imaged, a first converging unit that converges diffuse reflection rays from the object to be imaged, a second converging unit that converges specular reflection rays from the object to be imaged, an image pickup unit that receives the rays converged by the first converging unit and by the second converging unit, and generates image signals corresponding to each rays, an image data generating unit that generates image data by combining first image signals corresponding to the rays converged by the first converging unit with second image signals corresponding to the rays converged by the second converging unit, and an image data output unit that outputs the image data generated by the image data generating unit.

5 Claims, 6 Drawing Sheets

IMAGING APPARATUS

BACKGROUND

1. Technical Field

The present invention relates to a technique for scanning the surface appearance and color of an object to be imaged.

2. Related Art

The surface of an object has a particular "surface appearance." For example, the surface of a polished metal gives a "glossy appearance" to the watcher. The surface of a fabric gives a distinctive fabric contour and an aesthetic property of the weave with warp and weft, namely, a "texture" to the watcher. To make a more realistic visual representation of an object using a scanner, it is necessary to scan information about the object's surface appearance such as gloss or texture and reproduce the surface appearance.

SUMMARY

The present invention addresses scanning of information about the surface appearance of an object to be imaged and good scanning of the color of the object itself.

The present invention provides an imaging apparatus including a light application unit that applies light to an object to be imaged, a first converging unit that converges diffuse reflection rays from the object to be imaged, a second converging unit that converges specular reflection rays from the object to be imaged, an image pickup unit that receives the rays converged by the first converging unit and the rays converged by the second converging unit, and generates image signals corresponding to each rays, an image data generating unit that generates image data by combining first image signals generated by the image pickup unit, corresponding to the rays converged by the first converging unit with second image signals generated by the image pickup unit, corresponding to the rays converged by the second converging unit, and an image data output unit that outputs the image data generated by the image data generating unit.

BRIEF DESCRIPTION OF THE DRAWINGS

The above and other aspects, features, and advantages of the present invention will be more apparent from the following description of an illustrative embodiment thereof, taken in conjunction with the accompanying drawings, wherein:

DETAILED DESCRIPTION (1) Relation Between Object To Be Imaged and Incident Light and Reflection Rays First, incident light and reflection rays are briefly explained. FIG. 1 provides a conceptual view of light reflection from the surface of an object to be imaged. It is generally understood that incident light that strikes the surface of an object to be imaged at an incident angle $\theta_1$ reflects at a reflection angle $\theta_2$ which is equal to the incident angle $\theta_1$ (the law of reflection). In fact, however, incident light often reflects in all possible directions, not only reflecting at the reflection angle $\theta_2$. This is because the reflective surface is not always smooth and often has some concavity and convexity, when observed in the light wavelength order and equivalent. The reflective surface has concavity and convexity, with the natural result that the incident light reflects at varying angles according to the concavity and convexity. Herein, when seeing the reflective surface in a broad perspective, reflection from the reflective surface at approximately the same angle as the incident angle is referred to as "Specular Reflection" and such reflection rays are referred to as "specular reflection rays." Reflection from the reflective surface in all possible directions, independent of the incident angle, is referred to as "Diffuse Reflection" and such reflection rays are referred to as "diffuse reflection rays." In general, a surface that reflects light that includes a larger proportion of specular reflection is glossier. In more detail, the glossiness of an object depends on microscopic surface condition of its surface (reflective surface); the smoother the microscopic surface is, the higher the glossiness will be. In FIG. 1, the course in which specular reflection rays travel is marked with $L_{sr}$ and the courses in which diffuse reflection rays travel are marked with $L_{dr}$ (the same applies to FIGS. 4, 8, and 9 as well).

(2) Configuration of Embodiment

Next, a configuration of an image forming apparatus according to an embodiment of the present invention is described.

Figure 1:
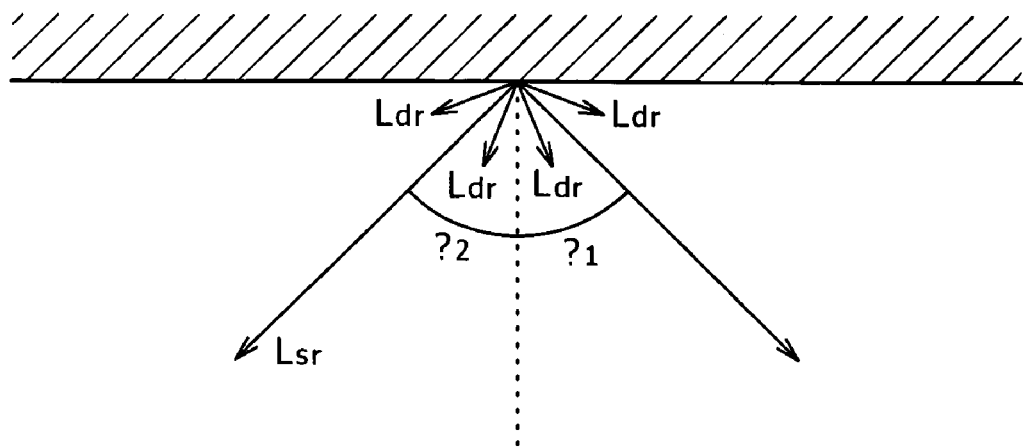
FIG. 1 provides a conceptual view of light reflection from an object to be imaged.
Figure 2:
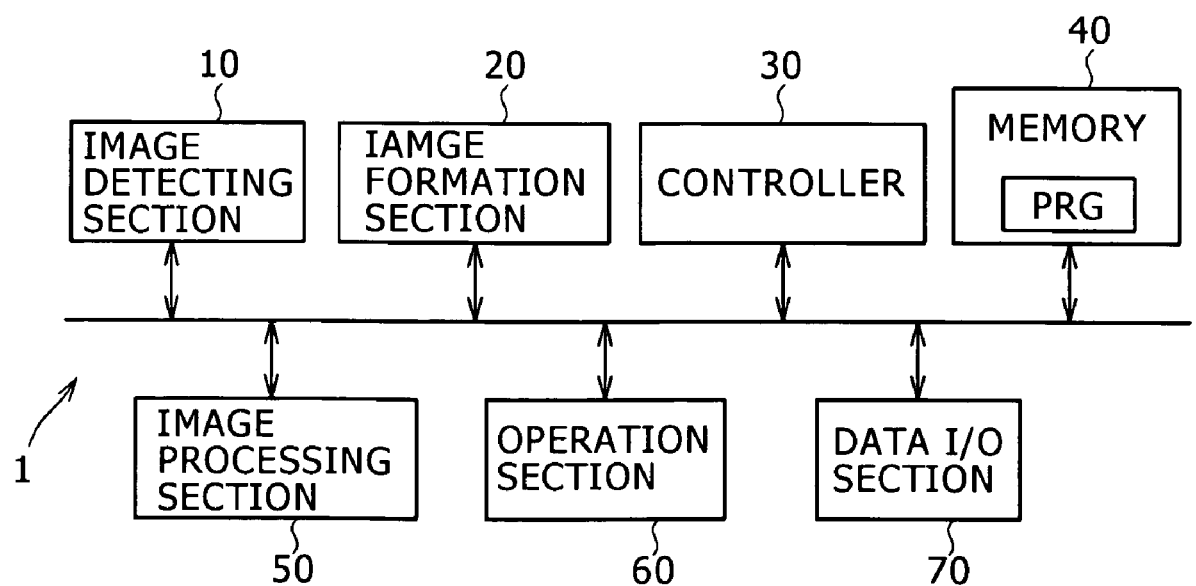
FIG. 2 is a block diagram showing a functional structure of an image forming apparatus according to an embodiment of the present invention.

FIG. 2 is a block diagram showing a functional structure of the image forming apparatus 1 according to an embodiment of the present invention. The image forming apparatus 1 includes an image scanner 10, an image formation section 20, a controller 30, a memory 40, an image processing section 50, an operation section 60, and a data I/O section 70. The controller 30 is a computer including a Central Processing Unit (CPU), a Random Access Memory (RAM), a Read Only Memory (ROM), etc, which are not shown, and it controls the operation of each component of the image forming apparatus 1 by executing a suite of programs PRG stored in the memory 40. The memory 40 is, for example, a large-capacity storage device such as a Hard Disk Drive (HDD) and stores the above programs PRG. The image processing section 50 includes plural image processing circuits such as Application Specific Integrated Circuits (ASICs) and Large Scale Integrations (LSIs), an image memory for temporarily storing image data, etc., wherein various image processing tasks are performed by each image processing circuit.

The image scanner 10 scans an object to be imaged such as, for example, paper, fabric, etc., and generates image data. The image formation section 20 forms a toner image on a recording material such as recording paper, based on the image data.

The image processing section 50 performs predetermined image processing on image signals generated by the image scanner 10 to generate image data and outputs the image data to the image formation section 20. The image processing section 50 may output the image data to the data I/O section 70 and the operation section 60, as required. The operation section 60 includes, for example, a touch panel type display and various function buttons. The operation section 60 displays an image based on the image data output by the image processing section 50 and accepts a request input by the operator. The request input by the operator is delivered to the controller 30. The data I/O section 70 is an interface device for data transfer to and receiving from an external device.

Figure 3:
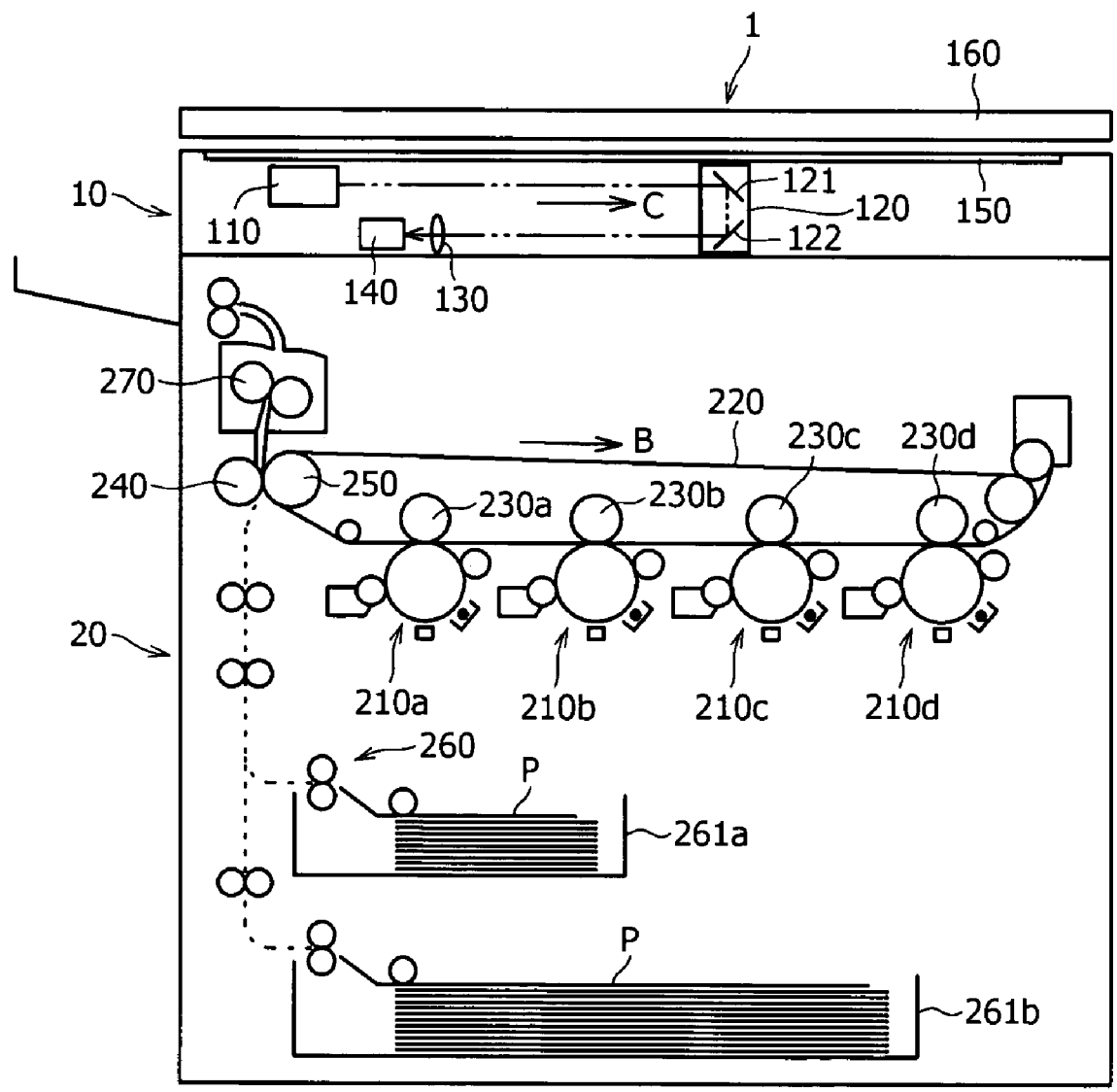
FIG. 3 illustrates a hardware configuration of the image forming apparatus.

Next, FIG. 3 illustrates a hardware configuration of the image forming apparatus 1.

First, the configuration of the image scanner 10 is described. The image scanner 10 includes a full-rate carriage 110, a half-rate carriage 120, a converging lens 130, a line sensor 140, a platen glass 150, and a platen cover 160.

Figure 4:
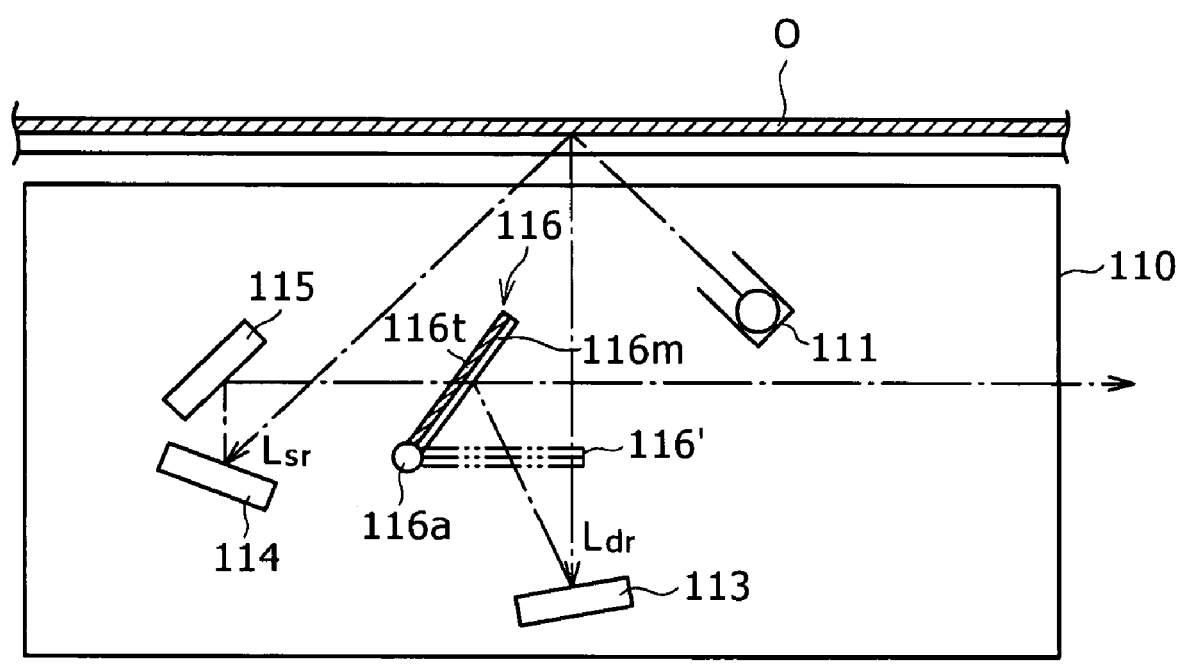
FIG. 4 illustrates a structure of a full-rate carriage included in the image forming apparatus according to the present embodiment.

FIG. 4 illustrates a detailed structure of the full-rate carriage 110. The full-rate carriage 110 includes, a light source 111, mirrors 113, 114, 115, and a turning reflector 116. The light source 111 is a single light source with a spectral energy distribution over the whole range of visible light, for example, a tungsten halogen lamp or xenon arc lamp. The light source 111 applies light to the object O to be imaged at an incident angle of about 45°. The mirrors 113, 114, and 115 reflect the reflection rays from the object O to be imaged and guide the rays to the half-rate carriage 120. The position of the mirror 113 is adjusted so that the reflection rays with a reflection angle of about 0° from the object O to be imaged will fall on the surface of the mirror 113. The position of the mirror 114 is adjusted so that the reflection rays with a reflection angle of about 45° from the object O to be imaged will fall on the surface of the mirror 114.

As above, the rays falling on the mirror 113 are those reflecting at an angle of about 0°, more exactly 0±5° (between −5° and +5°), from the object. The rays reflecting at this angle from the object are all diffuse reflection rays, not including specular reflection rays. Thus, from the course $L_{dr}$ of the rays reflected by the mirror 113, the diffuse reflection portion of reflection rays from the object O to be imaged can be scanned. The diffuse reflection portion mainly represents the color of the object to be imaged. On the other hand, the rays falling on the mirror 114 are those reflecting at an angle of about 45°, more exactly 45±10° (between 35° and 55°), from the object. The most rays reflecting at this angle are specular reflection rays. Thus, from the course $L_{sr}$ of the rays reflected by the mirror 114, the specular reflection portion of reflection rays from the object O to be imaged can be scanned. The specular reflection portion mainly represents the surface appearance of the object to be imaged.

An optimal position of the mirror 114 varies depending on the material and the like of the object O to be scanned and imaged. If the object O to be imaged is mainly a matter with a low glossiness, it is desired that the rays reflecting exactly at 45° from the object fall on the mirror 114. If the object O to be imaged is mainly a matter with a high glossiness, it is desired that the rays reflecting at an angle slightly deviating from 45° fall on the mirror 114. This is owing to the fact that the light intensity distribution of reflection rays by which glossiness is determined varies according to the glossiness.

Figure 5A:
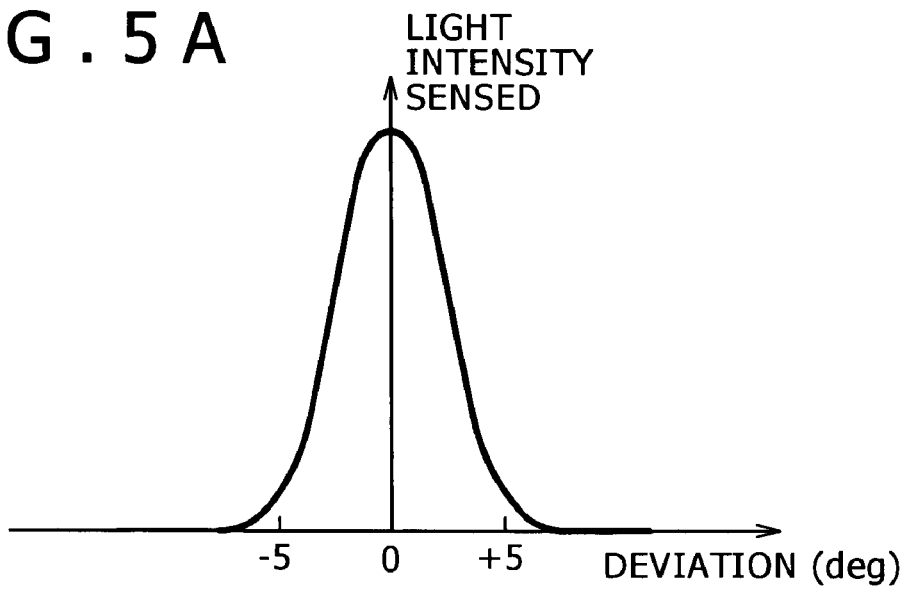
FIGS. 5A, 5B, and 5C are graphs of exemplary light intensity distributions of reflection rays from different objects to be imaged, when light is applied to each object.
Figure 5B:
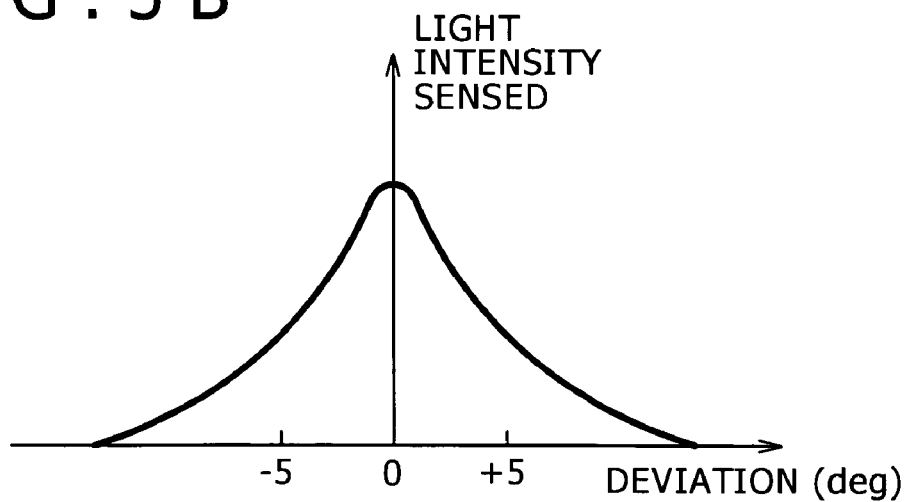
Figure 5C:
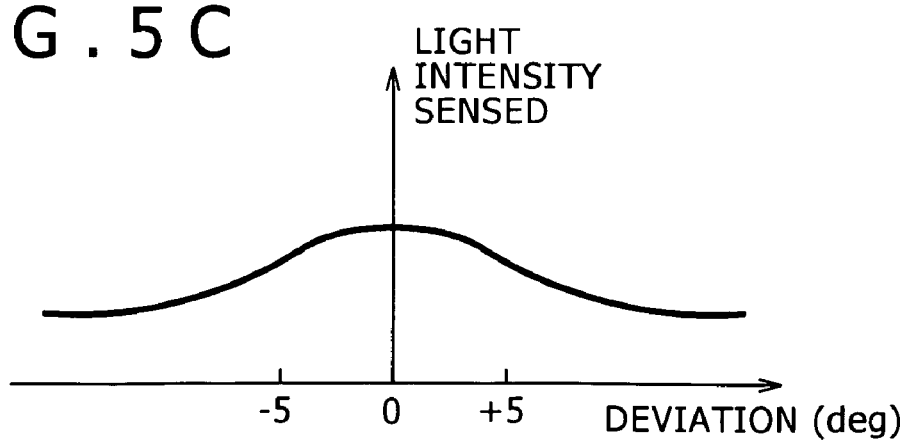

FIGS. 5A, 5B and 5C show graphs of exemplary light intensity distributions of reflection rays from different objects to be imaged, when light is applied to each object. For all graphs shown in these figures, the abscissa plots reflection angle deviation from the incident angle and the ordinate plots light intensity sensed. FIG. 5A shows the distribution in light intensity of reflection rays from an object to be image with very high glossiness, such as a polished metal surface. FIGS. 5B and 5C show the distributions in light intensity of reflection rays from, for example, a glossy fabric of fine surface appearance and Japanese paper with little glossiness, respectively, as the objects to be imaged. More specifically, FIG. 5C shows the distribution in light intensity of reflection rays from an object with low glossiness and FIG. 5B shows the distribution in light intensity of reflection rays from an object with glossiness which is intermediate between each sample's glossiness for FIG. 5A and FIG. 5C. As seen from these graphs, generally, the distribution in light intensity of reflection rays from a matter with a high glossiness shows a sharp high peak, which indicates that almost no light reflection takes place outside the range of specular reflection angles. In contrast, the distribution in light intensity of reflection rays from a matter with a low glossiness shows a relatively low peak, indicating that some amount of light reflection takes place outside the range of specular reflection angles.

Because the mirror 114 is for reflecting specular reflection rays, it is theoretically ideal that the rays reflecting from the object exactly at the specular reflection angle of 45° fall on the mirror 114. However, the rays reflecting from the surface of a matter with high glossiness as shown in FIG. 5A are of high light intensity. Such high light intensity input may exceed the dynamic range of a Charge Coupled Device (CCD) image sensor, namely, the scan limit of the line sensor 140. In that event, it becomes impossible to make an accurate measurement of the light intensity of the reflection rays. Therefore, it is necessary to deselect the specular reflection angle of 45° as the reflection angle from the object for the rays falling on the mirror 114, mainly in the case of scanning an object with high glossiness to be imaged. In particular, if the object to be imaged has a glossiness characterized by the light intensity distribution as shown in FIG. 5B, desirably, the mirror 114 should be positioned so that the rays reflecting from the object at an angle of 3 to 10° deviating from 45° will fall on the mirror 114.

On the other hand, when scanning the object to be imaged that has high glossiness, mainly characterized by the light intensity distribution as shown in FIG. 5A, a large angle deviation form 45° makes it impossible to measure the reflection rays from the surface. In this case, a small deviation such as 1° or 2° from 45° is desirable. If scanning is performed for general use not limited to a specific object to be scanned, the reflection angle from the object for the rays falling on the mirror 114 can be set appropriately (for example, in the range of 2 to 3° from 45°) so that as many types of matters as possible will be subjected to imaging. In this case, an image pickup unit with a large dynamic range may be employed as the line sensor 140 or the time of light exposure of the line sensor 140 may be shortened. Although the reflection angle from the object for the rays falling on the mirror 114 may not be set exactly at 45° as described above, that angle is herein assumed to be 45° for explanatory convenience.

Returning to FIG. 4, the turning reflector 116 has a mirror 116m which reflects rays on one side and a light trap 116t which absorbs rays on the other side. The light trap 116t is, for example, a porous polyurethane sheet having the surface that traps and absorbs most of the rays falling thereon. By a driving part which is not shown, this turning reflector 116 can be turned on the axis 116a between its position depicted with solid lines in the figure and its position depicted with dashed lines (116') in the figure. The turning reflector 116, when set in the solid-line position, reflects the rays from the mirror 113 and guides them to the half-rate carriage 120, while it absorbs the rays from the mirror 115. The turning reflector 116, when set in the dashed-line position, allows the rays from the mirrors 114 and 115 to travel to the half-rate carriage, while it absorbs the rays traveling toward the mirror 113. The rays reflected by the turning reflector 116 join the course of the rays reflected by the mirror 115. In consequence, two different ways of reflection rays can be received by the same image pickup unit (line sensor 140).

The structure of the full-rate carriage 110 is as described above. This full-rate carriage 110 is driven by a driving part which is not shown and scans the object O to be imaged, while being moved at a speed of v in the direction of arrow C shown in FIG. 3. In the following, this scan operation will be referred to as "scan operation". Particularly, a scan operation that scans the object by diffuse reflection rays from the object O to be imaged after the turning reflector 116 is moved to the solid-line position shown in FIG. 4 will be referred to as "scan operation based on diffuse reflection rays." A scan operation that scans the object by specular reflection rays from the object O to be imaged after the turning reflector 116 is moved to the dashed-line position shown in FIG. 4 will be referred to as "scan operation based on specular reflection rays."

The, referring to FIG. 3, other components of the image scanner 10 are descried.

The half-rate carriage 120 includes mirrors 121 and 122 and guides the rays from the full-rate carriage 110 to the converging lens 130. The half-rate carriage 120 is driven by a driving part which is not shown and moved at half the speed of the full-rate carriage 110 (namely, v/2) in the same direction as for the full-rate carriage 110.

The converging lens 130 is an element which is, for example, an fθ lens or the like, forming a part of an converging unit. The converging lens 130 is installed on the course of the rays running between the mirror 122 and the line sensor 140 to converge the rays from the object O to be imaged on the line sensor 140. This converging lens 130 is not limited to the one made up of a single lens and can include various members. In the present embodiment, mirrors, lenses, etc. present on any course of reflection rays are collectively referred to as a "converging unit." The mirror 113, turning reflector 116, half-rate carriage 120, and converging lens 130 constitute one converging unit that converges the diffuse reflection rays. The mirrors 114, 115, turning reflector 116, half-rate carriage 120, and converging lens 130 constitute another converging unit that converges the specular reflection rays.

The line sensor 140 generates image signals corresponding to the light intensity of converged rays and outputs the image signal. The line sensor 140 is the image pickup unit that can receive rays of different wavelengths simultaneously; it is made up of, for example, plural lines of CCD line sensors equipped with on-chip color filters (an array of image pickup elements). Each line of the CCD image sensors captures the image of the object O to be imaged at a distinct spectral sensitivity. The present embodiment uses the image sensors that are able to capture the image in four colors of B (blue), BG (blue green), G (green), and R (red). The line sensor 140 of the present embodiment outputs 8-bit signals for each of the four colors.

The platen glass 150 is a flat transparent glass plate on which the object O to be scanned and imaged is placed. On either surface of the platen glass 150, a reflection suppressing layer such as, for example, a dielectric multilayer film, is formed to reduce reflection from the surface of the platen glass 150. The platen cover 160 is installed to cover the platen glass 150 to shut out external light, thereby making it easy to scan the object O to be imaged, placed on the platen glass 150.

In the image scanner 10 configured as described above, the light source 111 applies light to the object O to be imaged, placed on the platen glass 150, and reflection rays from the object are scanned by the line sensor 140. Based on the scanned reflection rays, the line sensor 140 supplies image signals for the four colors of B, BG, G, and R to the image processing section 50 which will be described later. Based on the image signals, the image processing section 50 generates and outputs image data.

(3) Image Data Generation Method

The image scanner 10 performs two scan operations; that is, a scan operation based on the diffuse reflection rays from the object O to be imaged and a scan operation based on the specular reflection rays from the object O to be imaged. Image signals obtained by each scan operation are combined into image data. The image data thus obtained represents both the color and surface appearance of the object O to be imaged. The reason for this will be described below.

Figure 6:
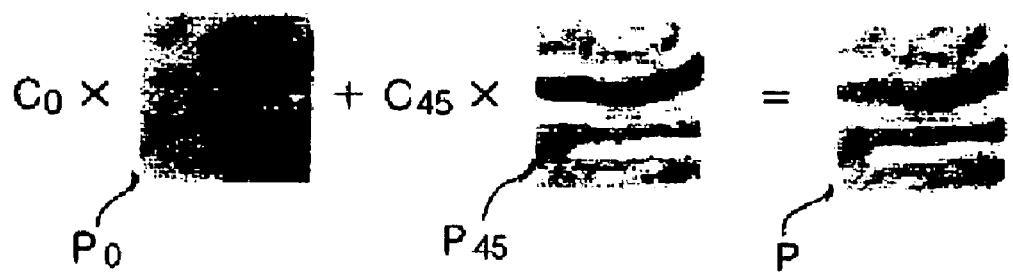
FIG. 6 illustrates examples for an image captured by diffuse reflection rays from an object to be image, an image captured by specular reflection rays from the same object, and a composite image of these images.

FIG. 6 illustrates examples for an image $P_0$ captured by the diffuse reflection rays (reflection angle of 0°) from a velvet-like object O to be imaged, an image $P_{45}$ captured by the specular reflection rays (reflection angle of 45°) from the same object, and a composite image P obtained by combining these images. On the velvet surface, minute concavo-convex patterns are found in a microscopic view, while, overall, this fabric has a glossy appearance. The former image $P_0$ captured by the diffuse reflection rays well represents the color of the object O to be imaged, as shown, but is lack of concavo-convex or glossy appearance. The latter image $P_{45}$ captured by the specular reflection rays provides the concavo-convex or glossy appearance very clearly, as shown, but the color of the glossy sections is lost and becomes white. The color images corresponding to the images shown in FIG. 6 in question and FIG. 7 which will be discussed later will be submitted separately.

Then, the image processing section 50 generates image data that well represents both the color and the surface appearance of the object O to be imaged by combining the image signals generated by the line sensor 140 according to the diffuse reflection rays and the image signals generated by the line sensor 140 according to the specular reflection rays, taking advantage of the features of both. In particular, the image processing section 50 receives image signals (first image signals) based on the diffuse reflection rays with the reflection angle of 0° from the line sensor 140 as a result of execution of the scan operation based on the diffuse reflection rays, and multiplies the first image signals by a first coefficient $C_0$. Next, the image processing section 50 receives image signals (second image signals) based on the specular reflection rays with the reflection angle of 45° from the line sensor 140 as a result of execution of the scan operation based on the specular reflection rays, and multiplies the second image signals by a second coefficient $C_{45}$. Based on image signals obtained by adding the products of multiplying the first image signals by the first coefficient and the products of multiplying the second image signals by the second coefficient, the image processing section 50 generates image data representing the composite image P to be output finally. Here, it is assumed that first coefficient $C_0$+second coefficient $C_{45}$=1 (providing $0 \leq C_0 \leq 1$ and $0 \leq C_{45} \leq 1$). That is, the sum of a weight (=coefficient $C_0$) for "color" represented by the first image signals and a weight (=coefficient $C_{45}$) for "surface appearance" represented by the second image signals should be "1," so that both color and surface appearance can be well reproduced in a balanced manner. The scan operation based on the diffuse reflection rays from the object O to be imaged and the scan operation based on the specular reflection rays from the object O to be imaged are executed in arbitrary order.

Proper values of the first coefficient $C_0$ and the second coefficient $C_{45}$ may be predetermined; for example, both the first coefficient $C_0$ and the second coefficient $C_{45}$ are 0.5. However, the operator is allowed to determine appropriate values of the coefficient, when necessary, in the following manner.

Figure 7:
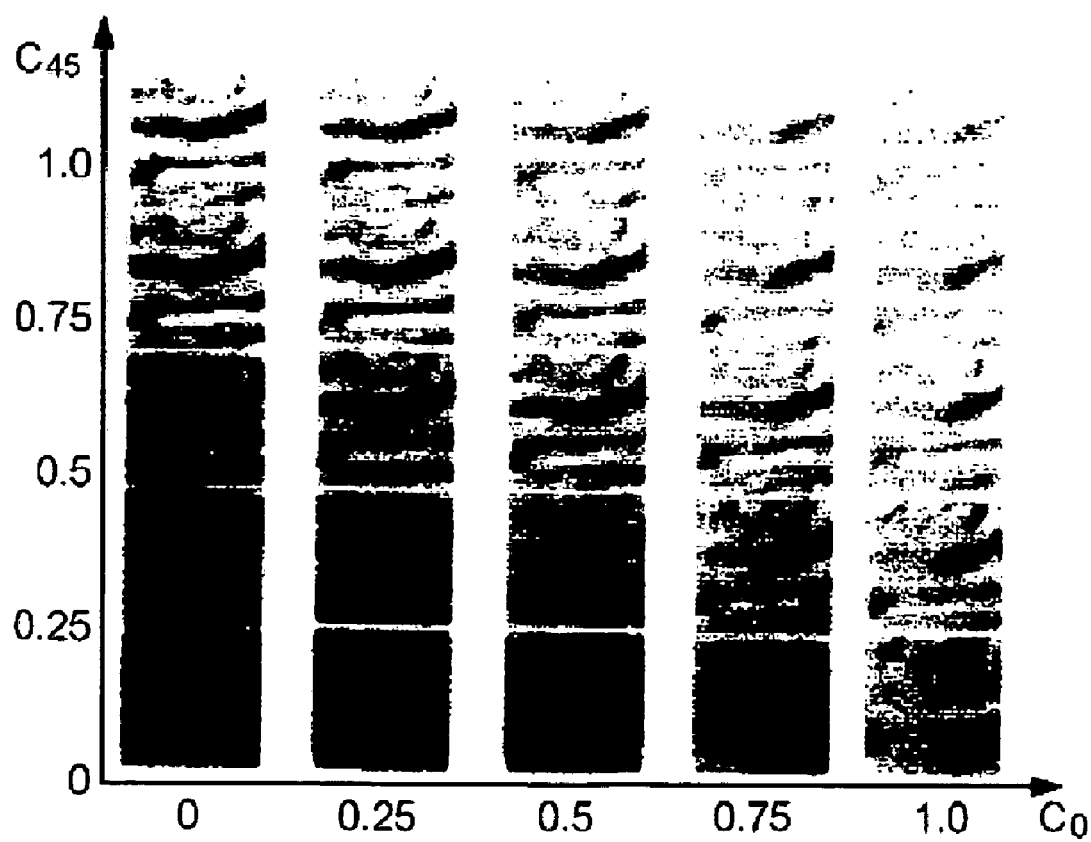
FIG. 7 illustrates a list of images generated by using plural combinations of values of a first coefficient $C_0$ and a second coefficient $C_{45}$.

FIG. 7 illustrates image examples generated by using plural combinations of the values of the first coefficient $C_0$ and the second coefficient $C_{45}$. In FIG. 7, both values are subject to the constraints $0 \leq C_0 \leq 1$ and $0 \leq C_{45} \leq 1$. For example, for an image in the rightmost position in the top row in FIG. 7, $C_0 = 1$ and $C_{45} = 1$. For an image in the second position from the right in the third row from the top, $C_0 = 0.75$ and $C_{45} = 0.5$. As can be appreciated from FIG. 7, the closer to 1 the first coefficient $C_0$ and the closer to 0 the second coefficient $C_{45}$, the more accurate color will be represented, while the image becomes lack of surface appearance. On the contrary, the closer to 1 the second coefficient $C_{45}$ and the closer to 0 the first coefficient $C_0$, the clearer will be surface appearance, while the color of a part of the image is lost. The image processing section 50 supplies data for these plural images to the operation section 60 and causes the display to present a list of those images as shown in FIG. 7. From among these plural images, the operator can choose an image that is regarded as a balanced representation of surface appearance and color, most analogous to the object O to be imaged observed by eyes by touching that image. The image processing section 50 supplies image data corresponding to the image thus selected by the operator to the image formation section 20. Based on this image data, the image formation section 20 forms the image on recording paper.

Then, referring to FIG. 3, a configuration of the image formation section 20 is described. As shown in FIG. 3, the image formation section 20 includes image formation units 210a, 210, 210c, and 210d, an intermediate transfer belt 220, primary transfer rolls 230a, 230b, 230c, and 230d, a secondary transfer roll 240, a backup roll 250, a paper feed mechanism 260, and a fusing mechanism 270. The intermediate transfer belt 220 is a loop belt member that is moved in the direction of arrow B shown in the figure by a driving part which is not shown. The primary transfer rolls 230a, 230b, 230c, and 230d are pressed against the outer surfaces of the photoconductor drums of the image formation units 210a, 210, 210c, and 210d by urging force, sandwiching the intermediate transfer belt 220. Toner images are formed on the surfaces of these photoconductor drums and transferred to the intermediate transfer belt 220. The secondary transfer roll 240 and the backup roll 250 are pressed against each other by urging force in a position where the intermediate transfer belt 220 contacts with the surface of recording paper P and transfer the toner images from the intermediate transfer belt 220 to the recording paper P. The paper feed mechanism 260 includes paper trays 261a and 261b containing different kinds of recording paper P and supplies a sheet of the recording paper P when image formation is performed. The fusing mechanism 270 includes roll members for heating and pressing the recording paper P and fuses the toner images transferred onto the surface of the recording paper P by heat and pressure. In this way, the image formation section 20 forms an image on the recording paper P, using toners for each color. The image formation section 20 configured as described above forms an image on the recording paper, based on image data supplied by the image processing section 50.

According to the above-described embodiment, the image forming apparatus 1 generates image data by combining the first image signals obtained by the diffuse reflection rays from the object O to be imaged and the second image signals obtained by the specular reflection rays from the object O to be imaged. Since the first image signals obtained by the diffuse reflection rays are those for detecting color information of the object to be imaged and the second image signals obtained by the specular reflection rays are those for detecting the surface appearance of the object to be imaged, the image data obtained by combining these first and second image signals can represent the color and surface appearance of the object to be imaged. In this way, the color and surface appearance can accurately be scanned from the object O to be imaged.

(4) Modification Examples

The foregoing embodiment can be modified as follows.

The full-rate carriage can be configured in several ways. For example, for the converging units including the mirrors and other elements, variant configurations are possible. Examples of such variants are shown in FIGS. 8 and 9.

Figure 8:
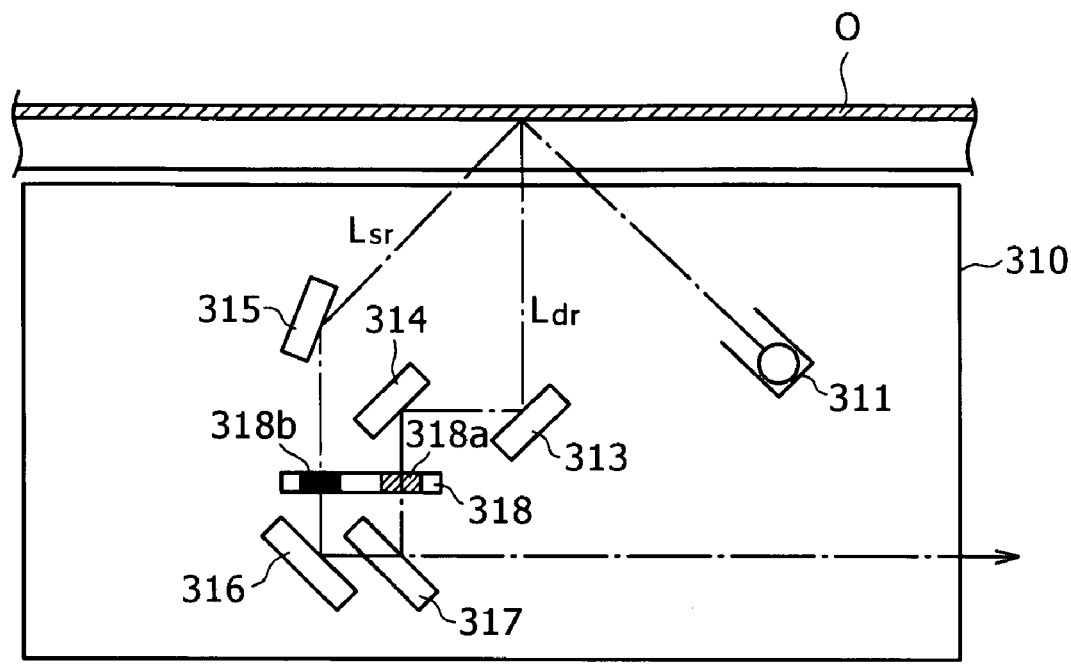
FIG. 8 illustrates one example of modification to the full-rate carriage.

A full-rate carriage 310 shown in FIG. 8 is an example in which a liquid crystal shutter is provided. In this figure, the full-rate carriage 310 includes a light source 311, mirrors 313, 314, 315, 316, a half mirror 317, and a liquid crystal shutter 118. The liquid crystal shutter 118 is a device that can vary light transmission through it by voltage application to it. Here, it is possible to vary light transmission in a region 138a through which diffuse reflection rays $L_{dr}$ pass and light transmission in a region 138b through which specular reflection rays $L_{sr}$ pass separately. The half mirror 317 reflects the diffuse reflection rays $L_{dr}$ from the mirror 314, while it allows the specular reflection rays $L_{sr}$ from the mirror 316 to pass through it. When scanning the diffuse reflection rays $L_{dr}$ with the full-rate carriage 310, the light transmission in the region 318a is increased up to nearly 100% and the light transmission in the region 318b is decreased down to nearly 0%. When scanning the specular reflection rays $L_{sr}$ with the full-rate carriage 310, the light transmission in the region 318a is decreased down to nearly 0% and the light transmission in the region 318b is increased up to nearly 100%. Even with this configuration, both the specular reflection rays $L_{sr}$ and the diffuse reflection rays $L_{dr}$ can be scanned by the full-rate carriage.

Figure 9:
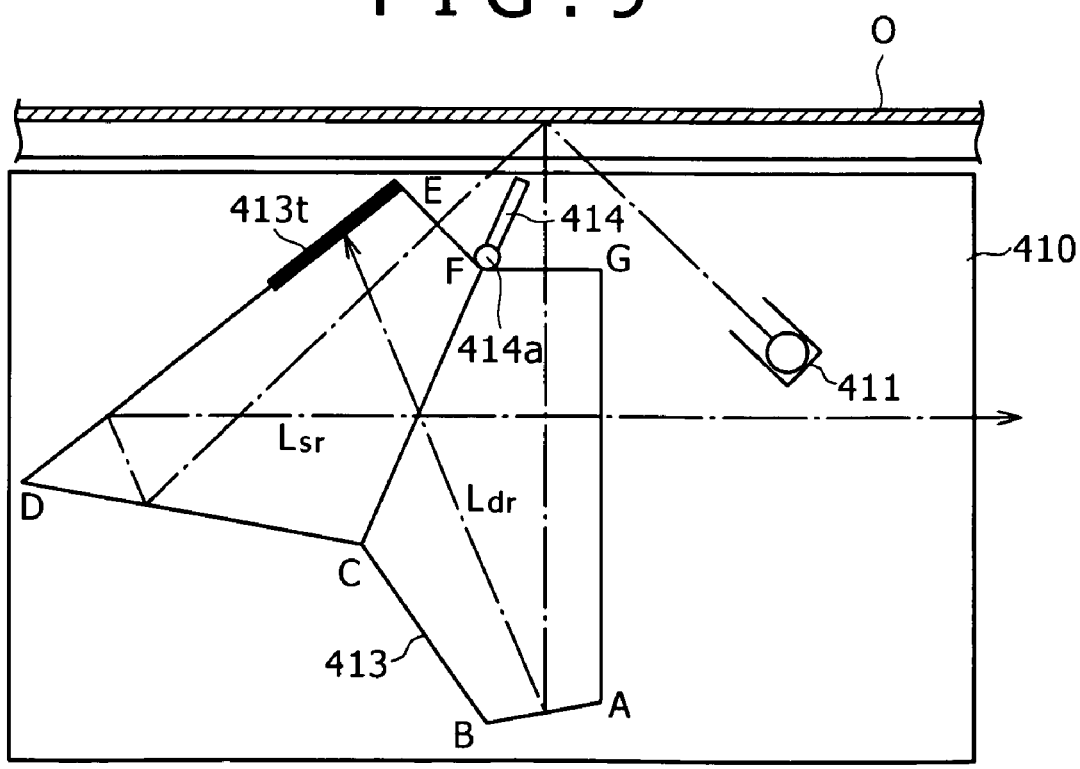
FIG. 9 illustrates another example of modification to the full-rate carriage.

A full-rate carriage 410 shown in FIG. 9 is an example in which a prism mirror is provided. In this figure, the full-rate carriage 410 includes a light source 411, a prism mirror 413, and a turning light trap 414. The prism mirror 413 is a multi-sided pillar made by coating the surfaces of plural prisms made of a glass material with a low refractive index and low distribution such as, for example, BK7 from Schott Corporation, with a mirror layer, a half mirror layer, a reflection preventive layer, or the like, and bonding the prisms with an optical cement having approximately the same refractive index as the glass material. The prism mirror 413 has a heptagonal cross section with vertices A, B, C, D, E, F, and G, and sides AB, CD, and DE are covered by vacuum-evaporated aluminum thin film having a mirror function. A half mirror is formed on a side CF. On a side DE, a portion 413t by a bold line in the figure is covered with a reflection preventive layer similar to the light trap 116t. The turning light trap 414 whose either surface is covered by a reflection preventive layer similar to the light trap 116t is turned on the axis 414a by a driving unit which is not shown. The turning light trap 414 absorbs the diffuse reflection rays $L_{dr}$ from the object O to be imaged when positioned along a side EF of the prism mirror 413 and absorbs the specular reflection rays $L_{sr}$ from the object O to be imaged when positioned along the side DE of the prism mirror 413. Even with this configuration, both the specular reflection rays $L_{sr}$ and the diffuse reflection rays $L_{dr}$ can be scanned by the full-rate carriage.

Of course, a variety of modifications other than the above examples are applicable, such as a modification made by increasing the number of times the rays are reflected.

In any case discussed above, the specular reflection rays $L_{sr}$ and the diffuse reflection rays $L_{dr}$ may travel from the object to be imaged up to the image pickup unit over the same distance, or the same length of the course. This eliminates the need for focal distance adjustment or the like each time scan operation is switched and processing efficiency can be enhanced. The specular reflection rays $L_{sr}$ and the diffuse reflection rays $L_{dr}$ may be reflected by the mirrors by an equal number of times which is odd or even. This can make the image orientation consistent when the reflection rays of either type are converged.

Then, examples of modification to the line sensor are discussed. In the foregoing embodiment, the line sensor 140 made up of plural lines of CCD image sensors equipped with on-chip color filters is illustrated. However, it will be appreciated that the present invention is not limited to such configuration. For example, the image pickup unit may be made up of one line of image sensor equipped with a sliding or rotary color filter. The line sensor can be configured in this way at less cost, but its drawback is that, as the number of colors to be scanned increases, the number of times of scan operations to be executed increases accordingly.

The number of colors to be scanned by the line sensor may be five or more colors, not limited to the four colors. The more the number of colors to be scanned, the more precisely spectral reflectivity can be estimated. However, four to six colors are reasonable through consideration of the data amount of image signals generated and the image processing time.

In the foregoing embodiment, the image formation section in which four image formation units are arranged in tandem is illustrated by way of example. However, the image formation section may be a rotary system. The image formation section may be equipped with a paper transport belt instead of the intermediate transfer belt and may directly transfer toner images from the photoconductor drums to recording paper without transferring them to an intermediate transfer body (intermediate transfer belt).

While the foregoing embodiment illustrated the application of the present invention to the image forming apparatus, the present invention is not limited to such embodiment. For example, an imaging apparatus (scanner) having the structure corresponding to the image scanner of the apparatus of the present embodiment is capable of outputting image signals in which the above glossiness information and surface appearance information can be specified and, thus, can produce a certain level of effect without the image formation section. The present invention can be embodied in such imaging apparatus.

In the described embodiment, an example is discussed where images generated by using plural combinations of the values of the first coefficient $C_0$ and the second coefficient $C_{45}$ are presented on the display in the operation section 60. Interaction with the operator is not so limited. These images may be displayed on a personal computer connected via a network to the image forming apparatus 1, so that the operator may select a desired image on the personal computer.

As described above, the present invention provides an imaging apparatus including a light application unit that applies light to an object to be imaged, a first converging unit that converges diffuse reflection rays from the object to be imaged, a second converging unit that converges specular reflection rays from the object to be imaged, an image pickup unit that receives the rays converged by the first converging unit and the rays converged by the second converging unit, and generates image signals corresponding to each rays, an image data generating unit that generates image data by combining first image signals generated by the image pickup unit, corresponding to the rays converged by the first converging unit with second image signals generated by the image pickup unit, corresponding to the rays converged by the second converging unit, and an image data output unit that outputs the image data generated by the image data generating unit.

The first image signals corresponding to the diffuse reflection rays mainly represent the color of the object to be imaged. The second image signals based on the specular reflection rays mainly represent the surface appearance of the object to be imaged. Therefore, image data obtained by combining the first image signals with the second image signals represents both the color and the surface appearance of the object to be imaged.

In an embodiment of the present invention, the image data generating unit may generate image data by adding products of multiplying the first image signals by a first coefficient and products of multiplying the second image signals by a second coefficient. In this case, the first coefficient and the second coefficient may be values in a range from 0 to 1, respectively, and the sum of the first coefficient and the second coefficient may be 1. The imaging apparatus may further include a display. The image data generating unit may generate image data by using plural combinations of the values of the first coefficient and the second coefficient and cause the display to present plural images based on the generated image data. The image data output unit may output image data representing an image selected by an operator from among the plural images presented on the display.

In an aspect of the present invention, the light application unit may apply light to the object to be imaged at an incident angle of approximately 45°. The first converging unit may converge the diffuse reflection rays reflecting from the object to be imaged at an angle between about −5° and about 5°, and the second converging unit may converge the specular reflection rays reflecting from the object to be imaged at an angle between about 35° and about 55°.

The present invention may be embodied in other specific forms without departing from its spirit or characteristics. The described embodiments are to be considered in all respects only as illustrated and not restrictive. The scope of the present invention is, therefore, indicated by the appended claims rather than by the foregoing description. All changes which come within the meaning and range of equivalency of the claims are to be embraced within their scope.

The entire disclosure of Japanese Patent Application No. 2005-091808 filed on Mar. 28, 2005 including specification, claims, drawings and abstract is incorporated herein by reference in its entirety.

What is claimed is:

1. An imaging apparatus comprising:
   a light application unit that applies light to an object to be imaged;
   a first converging unit that converges diffuse reflection rays from the object to be imaged;
   a second converging unit that converges specular reflection rays from the object to be imaged;
   an image pickup unit that receives the rays converged by the first converging unit and the rays converged by the second converging unit, and generates image signals corresponding to each rays;

an image data generating unit that generates image data by combining first image signals generated by the image pickup unit, corresponding to the rays converged by the first converging unit with second image signals generated by the image pickup unit, corresponding to the rays converged by the second converging unit; and an image data output unit that outputs the image data generated by the image data generating unit.

2. The imaging apparatus according to claim 1, wherein the image data generating unit generates image data by adding products of multiplying the first image signals by a first coefficient and products of multiplying the second image signals by a second coefficient.

3. The imaging apparatus according to claim 2, wherein the first coefficient and the second coefficient are values in a range from 0 to 1, respectively, and the sum of the first coefficient and the second coefficient is 1.

4. The imaging apparatus according to claim 2, further comprising a display, wherein the image data generating unit generates image data by using a plurality of combinations of the values of the first coefficient and the second coefficient and causes the display to present a plurality of images based on the generated image data, and the image data output unit outputs image data representing an image selected by an operator from among the plurality of images presented on the display.

5. The imaging apparatus according to claim 1, wherein the light application unit applies light to the object to be imaged at an incident angle of approximately 45°, the first converging unit converges the diffuse reflection rays reflecting from the object to be imaged at an angle between about −5° and about 5°, and the second converging unit converges the specular reflection rays reflecting from the object to be imaged at an angle between about 35° and about 55°.

* * * * *